(12) United States Patent
Thirion et al.

(10) Patent No.: US 11,013,171 B1
(45) Date of Patent: May 25, 2021

(54) LINE TRIMMER/MOWER WITH TWIST GRIP THROTTLE CONTROL

(71) Applicants: David L. Thirion, Oolagah, OK (US); Troy R. McClain, Oologah, OK (US)

(72) Inventors: David L. Thirion, Oolagah, OK (US); Troy R. McClain, Oologah, OK (US)

( * ) Notice: Subject to any disclaimer, the term of this patent is extended or adjusted under 35 U.S.C. 154(b) by 0 days.

(21) Appl. No.: 16/860,558

(22) Filed: Apr. 28, 2020

(51) Int. Cl.
*A01D 34/90* (2006.01)
*A01D 34/416* (2006.01)
*B26B 15/00* (2006.01)
*B27B 19/00* (2006.01)
*B23D 47/00* (2006.01)
*B27B 17/00* (2006.01)
*B23B 45/00* (2006.01)

(52) U.S. Cl.
CPC ......... *A01D 34/416* (2013.01); *A01D 34/905* (2013.01); *B23D 47/00* (2013.01); *B26B 15/00* (2013.01); *B27B 19/00* (2013.01); *B23B 45/00* (2013.01); *B27B 17/0008* (2013.01)

(58) Field of Classification Search
CPC .... A01D 34/416; A01D 34/905; A01D 34/90; B62K 23/04; B23D 47/00; B27B 17/0008; B27B 19/00; B23B 45/00; B26B 15/00
USPC ................................ 173/1, 170; 30/276, 392
See application file for complete search history.

(56) References Cited

U.S. PATENT DOCUMENTS

| 4,191,065 | A | * | 3/1980 | Golobay | B62K 23/04 123/182.1 |
|---|---|---|---|---|---|
| 4,953,294 | A | * | 9/1990 | Dohse | A01D 34/905 30/276 |
| 5,175,932 | A | * | 1/1993 | Lange | A01D 34/905 30/276 |
| 7,823,652 | B2 | * | 11/2010 | Nemcek | B27B 17/0008 173/1 |
| 2010/0038106 | A1 | * | 2/2010 | Nemcek | B23D 47/00 173/170 |
| 2018/0014461 | A1 | * | 1/2018 | Brewer | A01D 34/416 |
| 2018/0027731 | A1 | * | 2/2018 | Self | A01D 34/4165 |
| 2018/0103582 | A1 | * | 4/2018 | Self | A01D 34/84 |
| 2019/0075726 | A1 | * | 3/2019 | White | A01D 34/824 |
| 2019/0202523 | A1 | * | 7/2019 | Erdmann | B62K 23/04 |

* cited by examiner

*Primary Examiner* — Kenneth E Peterson
*Assistant Examiner* — Nhat Chieu Q Do
(74) *Attorney, Agent, or Firm* — GableGotwals

(57) ABSTRACT

A twist grip throttle assembly and weed trimmer utilizing the same are described herein. The weed trimmer has a power head on an upper end of a drive shaft assembly. The power head has a power provider, such as a gas powered motor. A base assembly with a cutter head for receiving wrapped cord is on a lower end of the drive shaft assembly. A throttle activator includes a tubular member rotationally mounted on the drive shaft assembly. The tubular member defines a gripping area. Twisting rotation of the throttle activator adjusts an amount of power produced by said power provider.

5 Claims, 3 Drawing Sheets

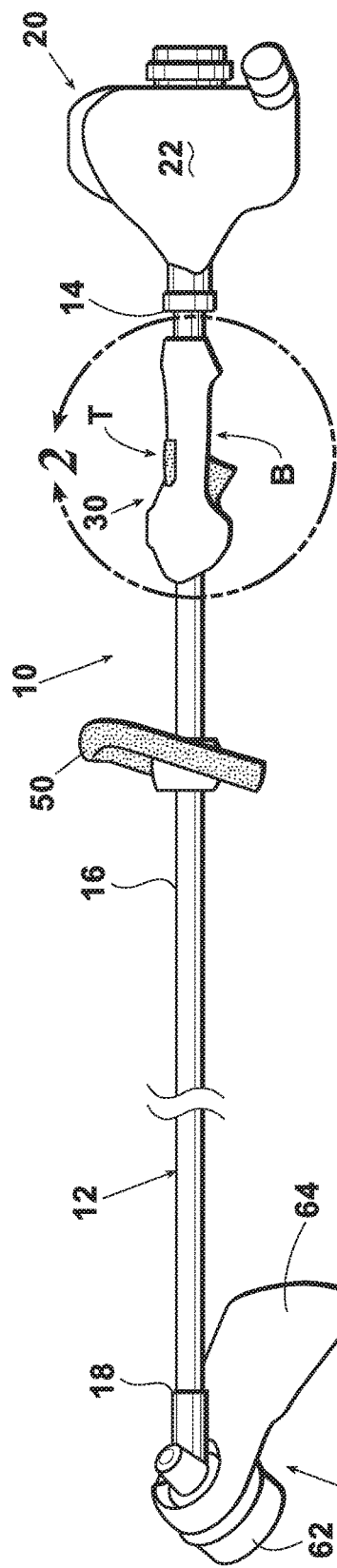
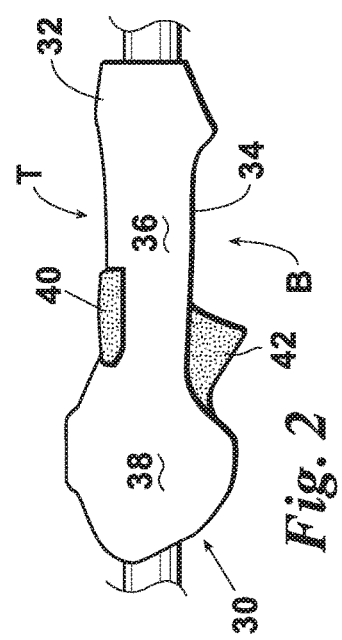
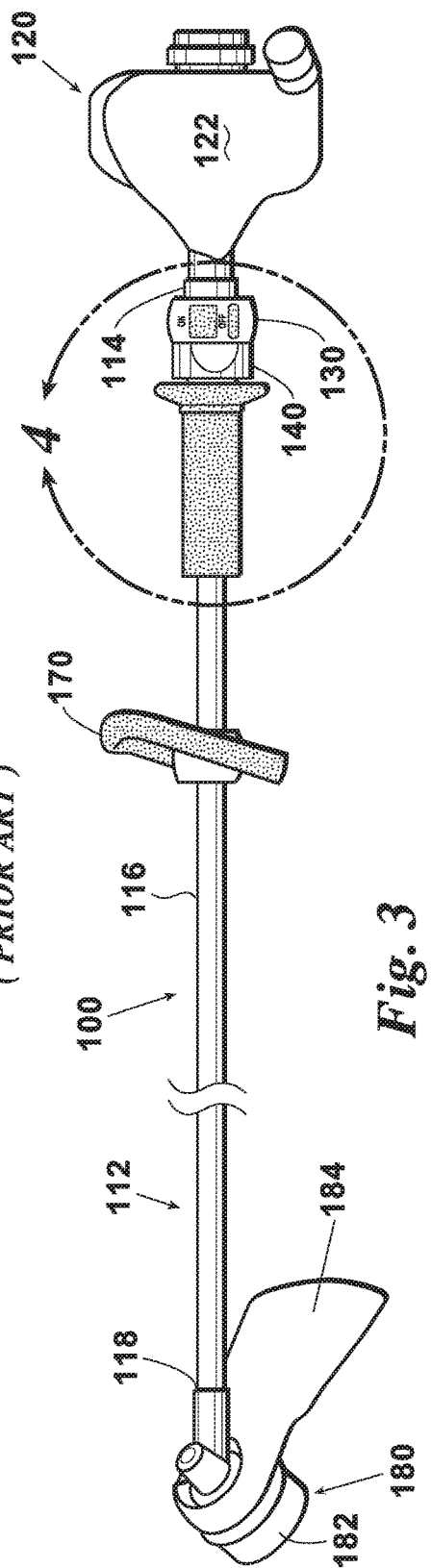
Fig. 1 (PRIOR ART)
Fig. 2 (PRIOR ART)
Fig. 3

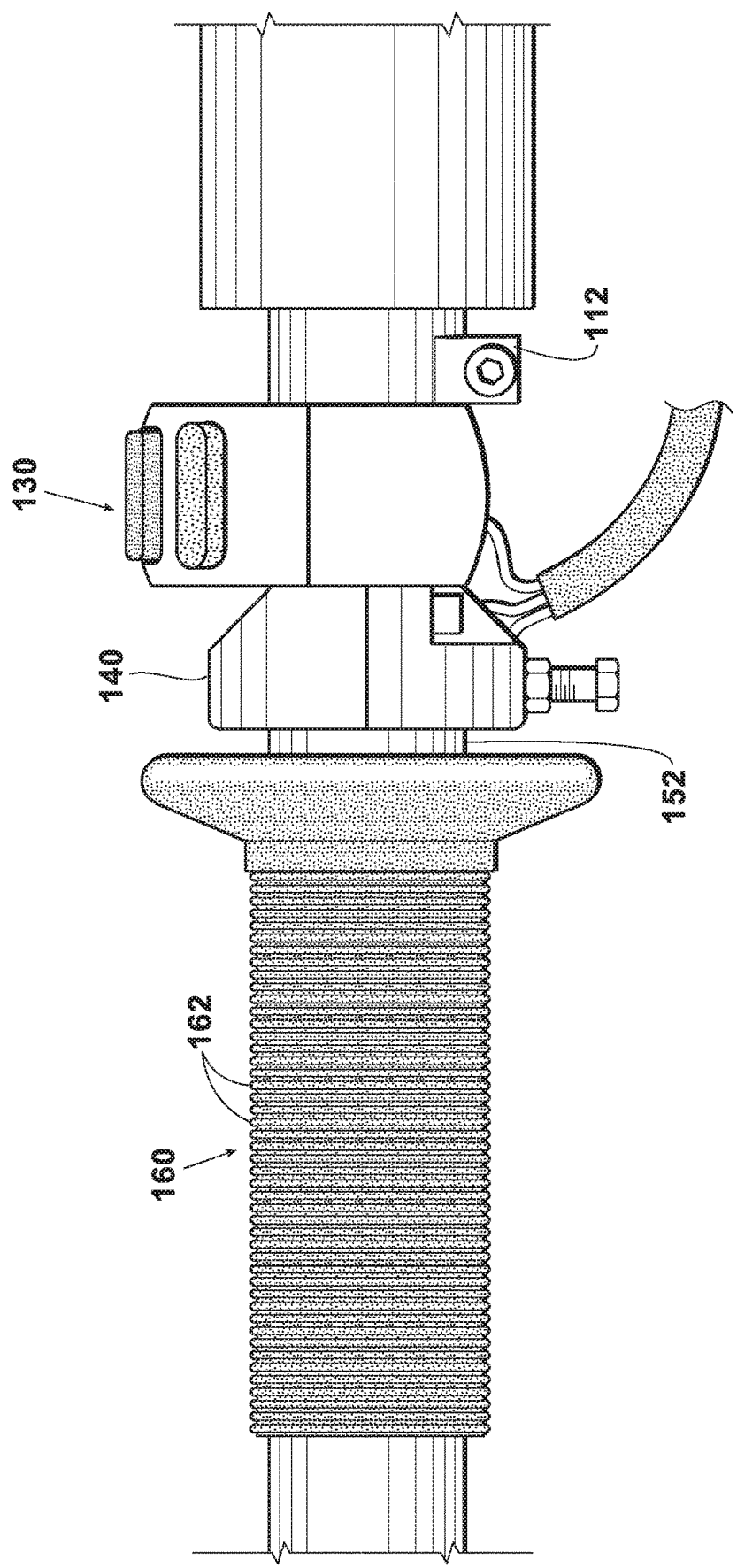

LINE TRIMMER/MOWER WITH TWIST GRIP THROTTLE CONTROL

BACKGROUND

The subject matter of this disclosure relates to weed trimmers. More particularly, the subject matter relates to a twist grip throttle assembly and weed trimmer utilizing the same.

Weed trimmers are common for household and commercial use. A typical prior art weed trimmer can be seen in FIGS. 1 and 2, which show prior art weed trimmer designated generally 10. Weed trimmer 10 includes drive shaft assembly 12 having upper end 14, midpoint 16, and lower end 18.

Power head 20 is located adjacent upper end 14 of drive shaft assembly 12. Power head 20 includes engine 22.

Throttle handle 30 is located on drive shaft assembly 12 between midpoint 16 and power head 20. Throttle handle 30 has top side 32 and bottom side 34 (FIG. 2). Throttle handle 30 defines grip area 36 and base portion 38. Grip area 36 includes throttle lockout switch 40 that protrudes from top side 32. Throttle handle 30 additionally includes throttle trigger 42 that extends from bottom side 34 proximate a junction of grip area 36 and base portion 38. Throttle trigger 42 is for manipulating a throttle cable that communicates with engine 22.

Support handle 50 is mounted on drive shaft assembly 12 between midpoint 16 of drive shaft assembly 12 and throttle handle 30.

Base assembly 60 is mounted on lower end 18 of drive shaft assembly 12. Base assembly 60 includes cutter head 62 and debris shield 64. Debris shield 64 typically includes a cutoff knife (not shown). Cutter head 62 typically has nylon cord wound thereon.

One drawback of the prior art design relates to the plastic trigger. Because of the short travel of the trigger, fine motor speed adjustment is difficult. Additionally, the trigger is vulnerable to damage when the weed trimmer is loaded onto a truck or trailer for transport.

Another drawback relates to the hand and arm position required by the trigger configuration, which results in operator fatigue.

Additionally, throttle cable replacement is difficult with a trigger assembly.

SUMMARY

Embodiments of this disclosure relate to a weed trimmer wherein the throttle control of a motor is controlled by a twist grip. The traditional handle piece with a trigger is replaced by a throttle assembly having a twist grip of the invention.

The weed trimmer of the disclosure includes a drive shaft assembly. A power head is located on an upper (first) end of the drive shaft assembly. The power head includes a power provider, such as a gas or electric powered motor.

A throttle assembly or throttle activator is located on the drive shaft assembly between the power head and the base assembly. In one embodiment, the throttle activator has a tubular member, such as a throttle tube, that defines a gripping area. The tubular member is rotatably mounted on the drive shaft assembly. A grip having vibration dampening ridges is preferably received on the gripping area of the throttle activator.

Rotation of the throttle activator adjusts an amount of power produced by the power provider. An on-off switch is mounted on the drive shaft between a midpoint and the power head. A split collar is mounted on the drive shaft assembly adjacent to the lower (second) side of the on-off switch.

A support handle is mounted on the drive shaft assembly between the midpoint of the drive shaft assembly and the throttle activator.

A base assembly is located on the lower end of the drive shaft assembly. The base assembly has a cutter head and a debris shield. A cut-off knife may be provided on the debris shield. A cord, e.g., a nylon cord, is wound on the cutter head.

The above described rotatably mounted throttle components may be provided as a retrofit kit for converting a traditional plastic trigger activated weed trimmer to a twist throttle activated trimmer.

Advantages of the throttle assembly of this disclosure include a more sensitive throttle control and reduced operator fatigue as compared to traditional trigger activated.

Dampened vibration is provided by a ribbed surface that is typically provided on the grip.

Additionally, an operator is able to maintain a more natural position during use, i.e., the operator's arm may be extended while controlling a throttle with the twist grip of the invention.

BRIEF DESCRIPTION OF THE DRAWINGS

FIG. 1 is a perspective view of a prior art weed trimmer;

FIG. 2 is a close-up view of area 2 of FIG. 1 of the throttle handle of the prior art weed trimmer;

FIG. 3 is a perspective view of a weed trimmer of the disclosure;

FIG. 6 is an elevation view of the throttle grip assembly of FIGS. 4 and 5.

DETAILED DESCRIPTION

Figure 4:
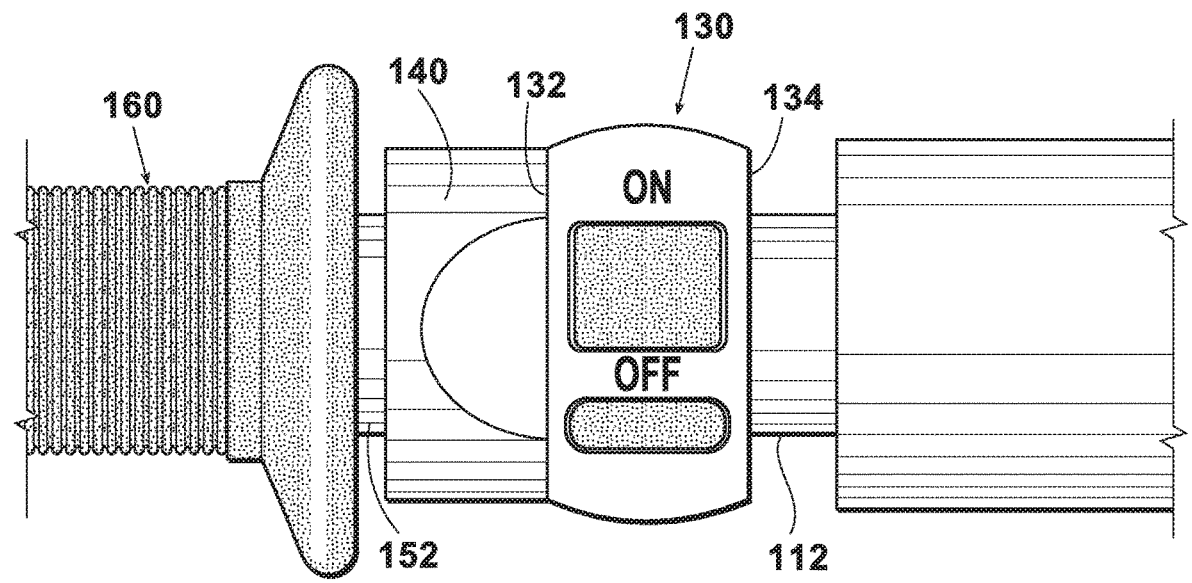
FIG. 4 is a close up elevation view of area 4 of FIG. 3 of the throttle grip of the weed trimmer wherein the split collar is in place.
Figure 5:
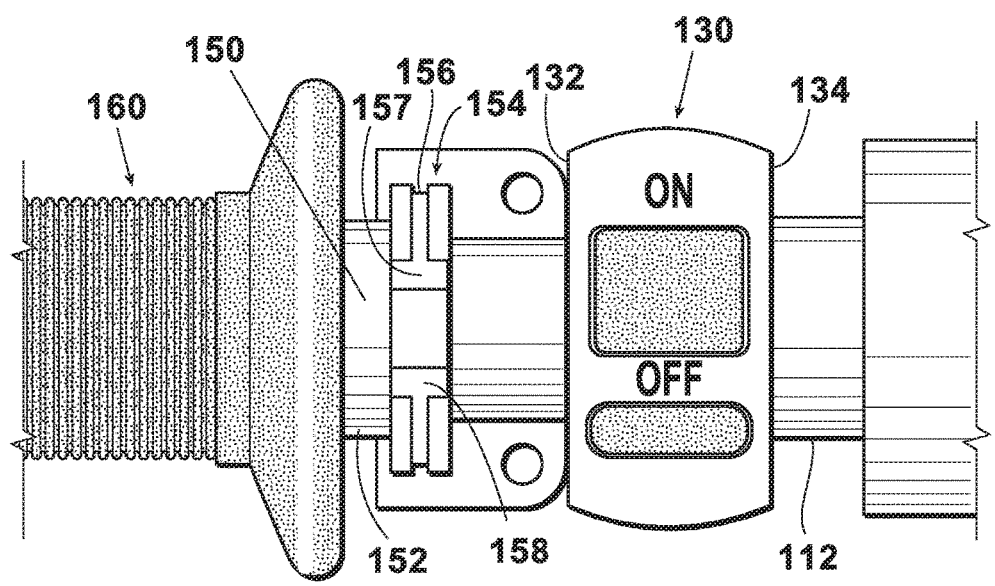
FIG. 5 is a close up elevation view of the throttle grip of FIG. 4 wherein the split collar is removed and a throttle tube is visible.

Referring now to FIGS. 3-5, shown is weed trimmer designated generally 100. Weed trimmer 100 includes drive shaft assembly 112 having upper (first) end 114, midpoint 116, and lower (second) end 118.

Power head 120 is located on upper end 114 of drive shaft assembly 112. Power head 120 includes engine 122.

On/off switch 130 is mounted on drive shaft assembly 112 between midpoint 116 and power head 120. On/off switch 130 has a lower (second) side 132 and an upper (first) side 134 (FIGS. 4, 5).

Split collar 140 (FIGS. 4, 6) is mounted on drive shaft assembly 112 adjacent lower (second) side 132 of on/off switch 130.

Throttle tube 150 is rotatably mounted to drive shaft assembly 112. Throttle tube 150 has grip mounting portion 152 and flange member 154 (FIG. 5). Flange member 154 defines an at least partially circumferential throttle cable channel 156. Flange member 154 defines a first throttle cable receiver 157 and a second throttle cable receiver 158. Flange member 154 is located within split collar 140. Although throttle tube 150 is shown and described herein as being co-axial with drive shaft assembly 112, it is contemplated that throttle tube 150 could be mounted on a branch of drive shaft assembly 112 that is oriented at an angle to a portion of the drive shaft assembly 150.

Grip 160 is mounted on grip mounting portion 152. Grip 160 preferably defines vibration dampening ribs. Twisting of grip 160 and flange member 154 of throttle tube 150 activates a throttle pulley on engine 122 via a first throttle cable mounted in first throttle cable receiver 157 and a second throttle cable mounted in second throttle cable receiver 158.

Support handle 170 is mounted on drive shaft assembly 112 between midpoint 116 of drive shaft assembly 112 and grip 160. Base assembly 180 is located on lower end 118 of drive shaft assembly 112. Base assembly 180 includes cutter head 182 and debris shield 184. Debris shield 184 is typically provided with a cutoff knife. Cutter head 182 typically has a nylon cord wound thereon.

Prior art weed trimmer 10 may be converted into a weed trimmer 100 utilizing the throttle grip of the disclosure by removing throttle handle 30 from drive shaft assembly 12/112. Tubular member 150 is rotationally mounted to drive shaft assembly 12/112. Tubular member 150 has a grip mounting portion 152. On-off switch 130 and split collar 140 are affixed to drive shaft assembly 12/112. In one embodiment, flange member is 154 is connected to tubular member 150 for receiving a throttle cable. The flange member 154 is preferably received in split collar 140. A grip may be located on grip mounting portion 152 of tubular member 150.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A weed trimmer comprising:
   a drive shaft assembly having a first end and a second end opposite the first end;
   a power head on said first end of said drive shaft assembly, said power head comprising a power provider;
   a base assembly on said second end of said drive shaft assembly, said base assembly having a cutter head for receiving cord wrapped thereon;
   a tubular member rotatably mounted on said drive shaft assembly between said power head and said base assembly, said tubular member defining a gripping area without any locking mechanism and including a flange member spaced from the gripping area;
   a grip received on said gripping area of said tubular member, the grip including a plurality of vibration dampening ribs along its entire length, each vibration dampening rib completely encircling the tubular member and being spaced from adjacent vibration dampening ribs of the plurality;
   an on/off switch mounted on the drive shaft assembly adjacent to said tubular member between the grip and the power head;
   a split collar mounted about the tubular member adjacent the on/off switch between the grip and the on-off switch;
   the flange member being located within the split collar and including an encircling channel having two ends at two throttle cable receivers, respectively;
   wherein rotation of the tubular member adjusts an amount of power produced by said power provider.

2. The weed trimmer according to claim 1 wherein:
   said tubular member is coaxial with said drive shaft assembly.

3. The weed trimmer according to claim 1 further comprising:
   the on/off switch having an on button and an off button.

4. The weed trimmer according to claim 1 wherein:
   said power provider is a gas powered motor.

5. The weed trimmer according to claim 1 wherein:
   said power provider is an electric motor.

* * * * *